United States Patent

Ingram

[15] 3,640,067
[45] Feb. 8, 1972

[54] TWO-PEDAL HYDRAULIC BRAKING SYSTEM

[72] Inventor: Brian Ingram, Warwickshire, England
[73] Assignee: Girling Limited, Tyseley, Birmingham, England
[22] Filed: Mar. 31, 1970
[21] Appl. No.: 24,195

[30] Foreign Application Priority Data

May 8, 1969 Great Britain......................23,442/69

[52] U.S. Cl..........................60/54.6 P, 60/54.6 E, 188/345, 188/358, 60/54.5 P
[51] Int. Cl..........................................................F15b 7/00
[58] Field of Search..............60/54.5 P, 54.5, 54.6 E, 54.6 P, 60/52 B; 188/345

[56] References Cited

UNITED STATES PATENTS

| | | | |
|---|---|---|---|
| 3,120,244 | 2/1964 | Hahn | 60/54.5 E |
| 3,520,577 | 7/1970 | Moyes | 188/345 |
| 2,992,533 | 7/1961 | Hodkinson | 60/54.6 P |
| 3,044,268 | 7/1962 | Harrison | 60/54.6 |
| 3,421,320 | 1/1969 | Kershner | 60/54.5 E |
| 3,376,078 | 4/1968 | Brace et al. | 60/54.5 E |
| 3,345,112 | 10/1967 | Kershner | 60/54.5 E |

Primary Examiner—Edgar W. Geoghegan
Assistant Examiner—A. M. Zupcic
Attorney—Imirie & Smiley

[57] ABSTRACT

A two-pedal hydraulic braking system incorporates two separate pedal-operated master cylinders. Each master cylinder includes a pressure space in a cylinder bore in front of a pedal-operated piston working in the bore. The pressure spaces are connected by a transfer connection which permits fluid to pass between the pressure spaces to compensate for uneven wear of the linings of brakes on opposite sides of the vehicle. Normally communication between each master cylinder and the transfer connection is cut off by a normally closed valve which is opened when the piston is moved axially in the bore.

11 Claims, 4 Drawing Figures

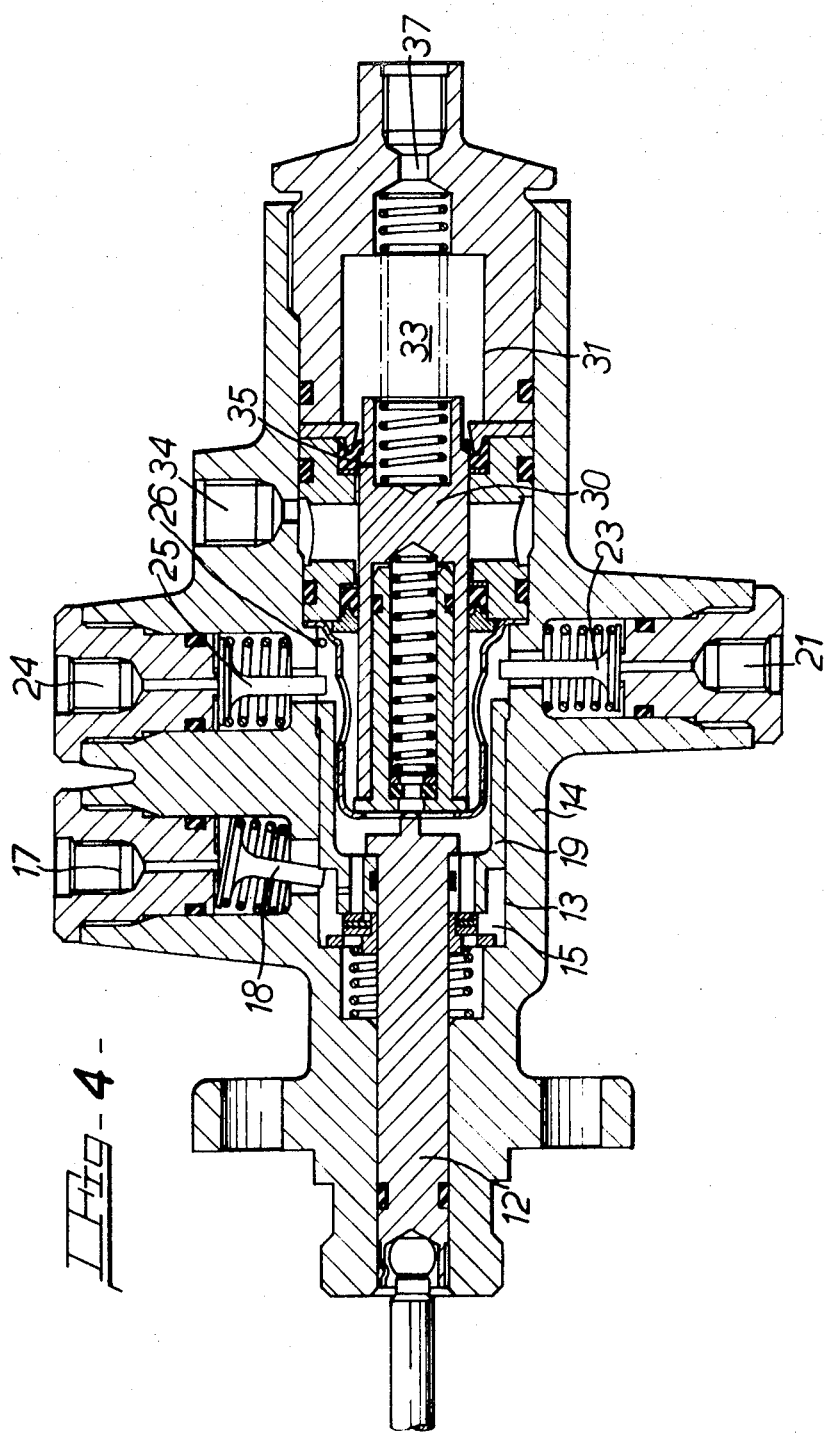

TWO-PEDAL HYDRAULIC BRAKING SYSTEM

SPECIFIC DESCRIPTION

This invention relates to a new or improved two-pedal power operated hydraulic braking system of the kind commonly used on agricultural tractors and like vehicles in which brakes on opposite sides of the vehicle are adapted to be applied by fluid from separate master cylinders each actuated by its own pedal.

The pedals can be operated simultaneously for retarding the vehicle or separately for steering.

Owing to the nature of the work done by the vehicle the linings of the brakes on one side of the other vehicle wear more rapidly than those on the other side and to apply the brake uniformly it is essential that, when the pedals are operated simultaneously equal fluid pressures are applied to the brakes on opposite sides of the vehicle.

According to our invention in an hydraulic braking system of the kind set forth each master cylinder comprises a positively actuated piston working in a bore in the cylinder body, a first passage in the cylinder body adapted to be connected to a source of fluid under pressure and opening into a pressure space in front of the piston, a normally closed first valve controlling the first passage, a second passage in the cylinder body adapted to be connected to a reservoir for the pressure source and leading into the pressure space, and a normally open second valve controlling the second passage, the pressure spaces of the two master cylinders being connected by a transfer connection which is isolated from the pressure spaces of both cylinders by normally closed transfer valves which are opened upon movement of the pistons in brake applying directions.

Preferably each transfer valve is opened in a predetermined sequence after closure of the second valve has been effected, and before opening of the first. When one pedal only is operated to advance the piston in one master cylinder, after the closure of the second valve, the transfer valve is opened and the transfer connection is then in communication with the pressure space in front of the piston, but fluid can not pass from the pressure space to the pressure space of the second master cylinder as the transfer valve in the second master cylinder remains closed.

If both pedals are operated simultaneously to advance the pistons in both master cylinders the transfer valves in both cylinders are opened and fluid can pass freely from the pressure space of one master cylinder to the other to compensate for uneven wear of the friction linings of the brakes on opposite sides of the vehicles.

Some braking systems incorporating our invention are illustrated in the accompanying drawings in which:

FIG. 4 is a longitudinal section through a practical form of master cylinder.

Figure 1:
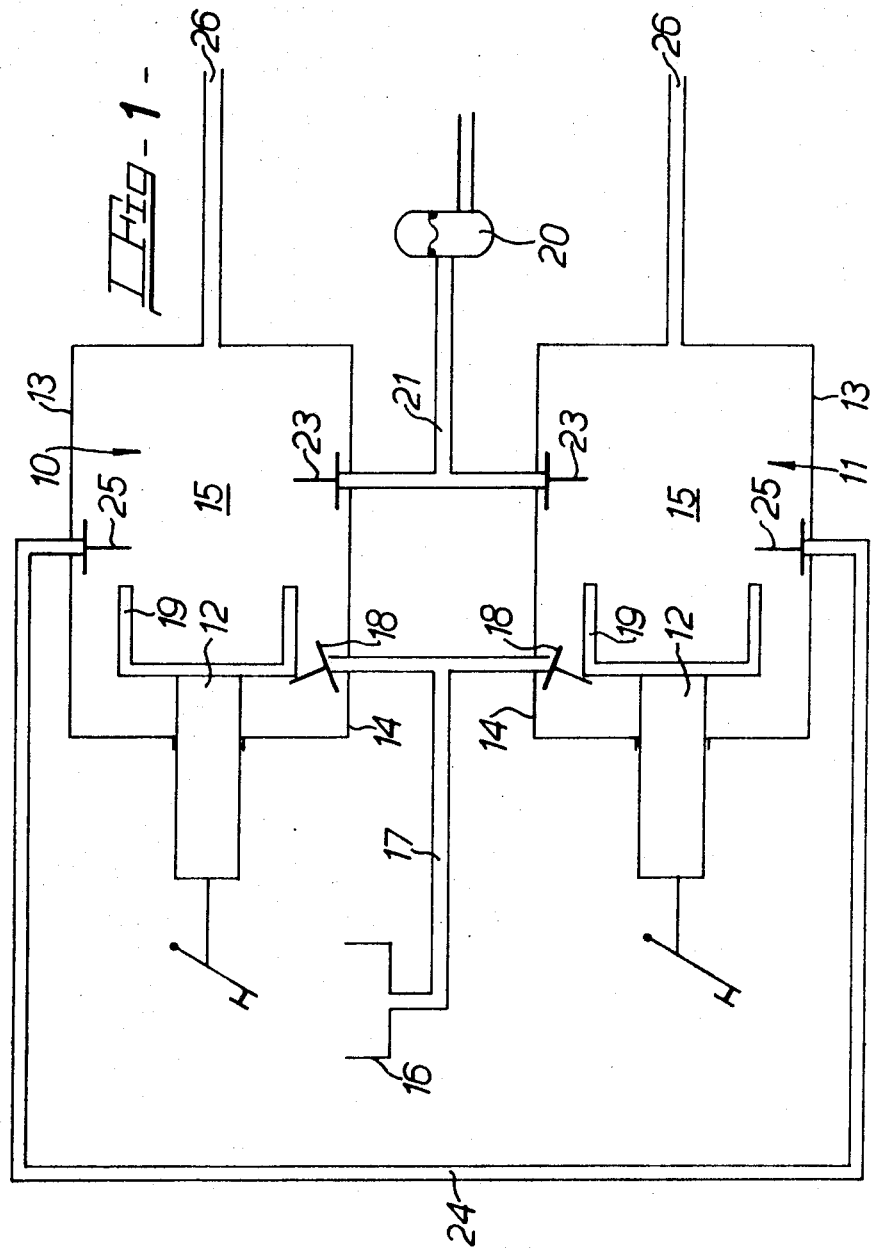
FIG. 1 is a schematic layout of an hydraulic braking system incorporating two pedal-operated master cylinders.

In the braking system illustrated in FIG. 1, two master cylinders 10 and 11 are arranged in side-by-side relationship. Each master cylinder 10, 11 comprises a pedal-operated main piston assembly 12 working in a bore 13 in a body 14. A pressure space 15 is defined between the inner end of the piston assembly 12 and the opposite end wall of the bore 13.

A reservoir 16 for hydraulic fluid is in communication through a line 17 with the pressure space 15 in each cylinder through a spring loading tipping valve 18. Each tipping valve 18, in the inoperative position shown, is normally held in an open position by the engagement with the stem of the valve 18 of the rear end of a cage member 19 carried by the piston assembly 12 in each respective cylinder.

The reservoir 16 provides a supply of fluid for a power operated pump (not shown) which is adapted to charge an hydraulic accumulator 20. The accumulator 20 is connected to the pressure space 15 of each cylinder through a common branched line 21 but the supply of hydraulic fluid to each pressure space is normally cut off by a normally closed spring loaded tipping valve 23. Each tipping valve 23 is provided with a stem which extends into the path of the inner end of the respective cage 19 and from which it is normally spaced.

In accordance with our invention the pressure spaces 15 of the master cylinders are interconnected by a line 24 through which flow of hydraulic fluid between the pressure spaces 15 is normally prevented by a normally closed spring loaded transfer valve 25 of the tipping type located in each master cylinder. Each transfer valve 25 is located at an intermediate point between the inner end of the cage and the tipping valve 23 and has a stem which extends into the path of the inner end of its respective cage and from which it is normally spaced.

The pressure space 15 of each master cylinder is provided with a connection 26 to the brake on wheels on one side of the vehicle.

In the fully retracted position of both pistons 12, as shown in the drawings, both tipping valves 18 are held in open positions by engagements with their stems of the cages 19 so that each pressure space 15 is in communication with the reservoir 16.

When the piston assembly 12 of one master cylinder for example the master cylinder 10 is advanced by operation of its pedal a short forward movement is sufficient to cause the cage 19 to be moved out of engagement with the stem of the tipping valve 18 and allow the valve to close under the action of its spring loading. Further movement of the piston assembly 12 causes the cage 19 to engage with the stem of the transfer valve 25 which is opened to place the pressure space 15 in communication with the line 24.

However, if the piston assembly 12 of the other master cylinder 11 has not been advanced, the transfer valve 25 of the master cylinder 11 remains closed so there can be no transfer of fluid between the pressure spaces 15 of the two master cylinders unless the pistons 12 of both master cylinders 10 and 11 are advanced simultaneously by operation of both pedals.

Further movement of the piston assembly 12 of the master cylinder 10 in the same direction opens the tipping valve 23 to allow fluid under pressure from the hydraulic accumulator 20 to enter the pressure space 15 from whence it is delivered to the brakes on wheels on the side of the vehicle supplied by that master cylinder 10 through the connection 26.

When the piston assemblies 12 of both master cylinders 10 and 11 are advanced simultaneously, upon opening of the transfer valves 25, the pressure space 15 of one cylinder is placed in communication with the pressure space 15 of the other and after the tipping valves 23 are opened, fluid supplied to the pressure spaces 15 from the hydraulic accumulator 20 can pass freely between the pressure spaces to compensate for uneven wear of the friction surfaces of the brakes on opposite sides of the vehicles.

It is arranged that closure of the valve 18 and opening of the valve 25 of each master cylinder takes place upon initial movement of the cage 19 through a relatively small distance to ensure that the transfer valve opens at the earliest possible moment. However, an additional movement of the cage, which is substantial in comparison with the said initial movement, is required to effect opening of the valves 23. This ensures that, when both master cylinders are operated simultaneously, the transfer valves 25 under all operating conditions are opened before the valves 23 are opened irrespective of the effect of the differential wear of the brake pedal linkages when pedals for operating the master cylinders are latched together, or differential wear of the brake pedal linkages which is further accentuated by differential movement of the pedal when unlatched.

Figure 2:
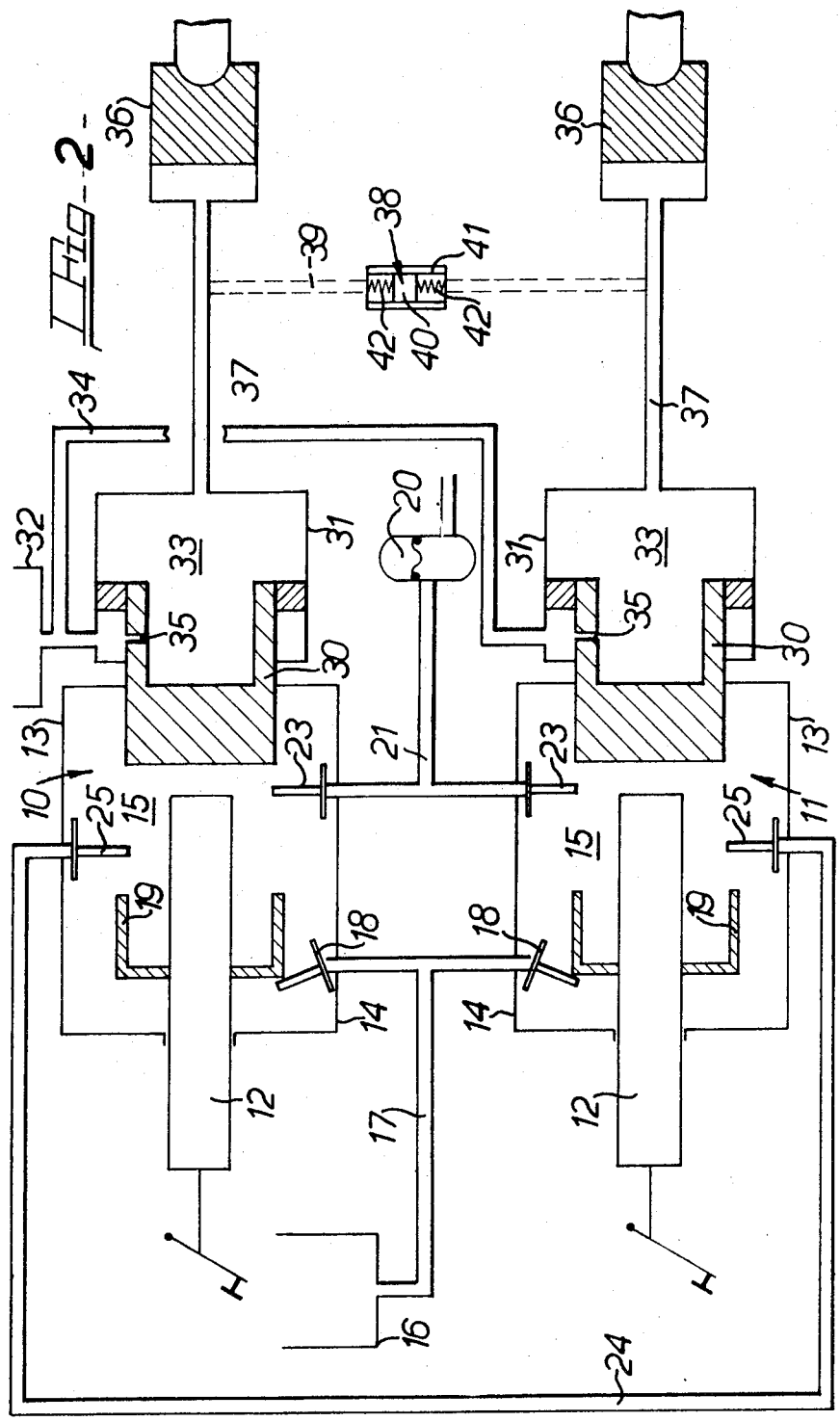
FIG. 2 is a schematic layout similar to FIG. 1 but including some modifications.

In the embodiment of FIG. 2, where corresponding reference numerals have been used to indicated corresponding parts, instead of fluid under pressure being supplied directly to the brakes on opposite sides of the vehicle from the pressure spaces 15, the pressure in each pressure space 15 acts on the outer end of a secondary piston 30 working in a secondary bore 31 in the master cylinder body. Fluid from an hydrostatic reservoir 32 is normally supplied to a secondary pressure space 33 between each secondary piston 30 and an adjacent end wall of the cylinder of each master cylinder 10, 11 through a branched line 34, and a radial recuperation port 35 in each secondary piston. The secondary pressure spaces 33 are connected to slave cylinders 36 of brakes on wheels of opposite sides of a vehicle through connections 37.

When the pressure space 15 of one master cylinder, for example the master cylinder 10, is pressurized by the supply to it of fluid under pressure from the pressure source, the pressure fluid in the pressure space 15 acts on the adjacent end of the secondary piston 30 to advance it in the secondary bore 31. Initially this movement closes the recuperation port 35 so that pressure builds up in the secondary pressure space 33 in front of the secondary piston 30. Further movement of the secondary piston 30 in the same direction delivers fluid under pressure from the pressure space 33 to the slave cylinder 36 for actuating the brakes on the wheels on the side of the vehicle adapted to be applied by master cylinder 10.

In the event of failure of the source of fluid under pressure, or the pressure space 15, the piston assembly 12 is adapted to engage the adjacent end of the secondary piston 30 to advance the second piston in the secondary bore as described above. In this condition, when the piston assemblies 12 are advanced simultaneously, means are incorporated for equalizing the braking effort applied to the brakes on opposite sides of the vehicle to compensate for uneven wear of the friction surfaces. As illustrated these compensation means comprises a shuttle valve 38 located in a line 39 connecting the connections 37 to the slave cylinders 36. The shuttle valve 38 comprises a valve member 40 working in a bore 41. The valve member 40 is adapted to be moved in a direction to equalize the pressures applied to the brakes on opposite sides of the vehicle against the force in one of a pair of oppositely acting return springs 42 normally holding the valve member 40 in a central position. The construction and operation of the embodiment of FIG. 2 is otherwise the same as FIG. 1 and need not be further described herein.

Figure 3:
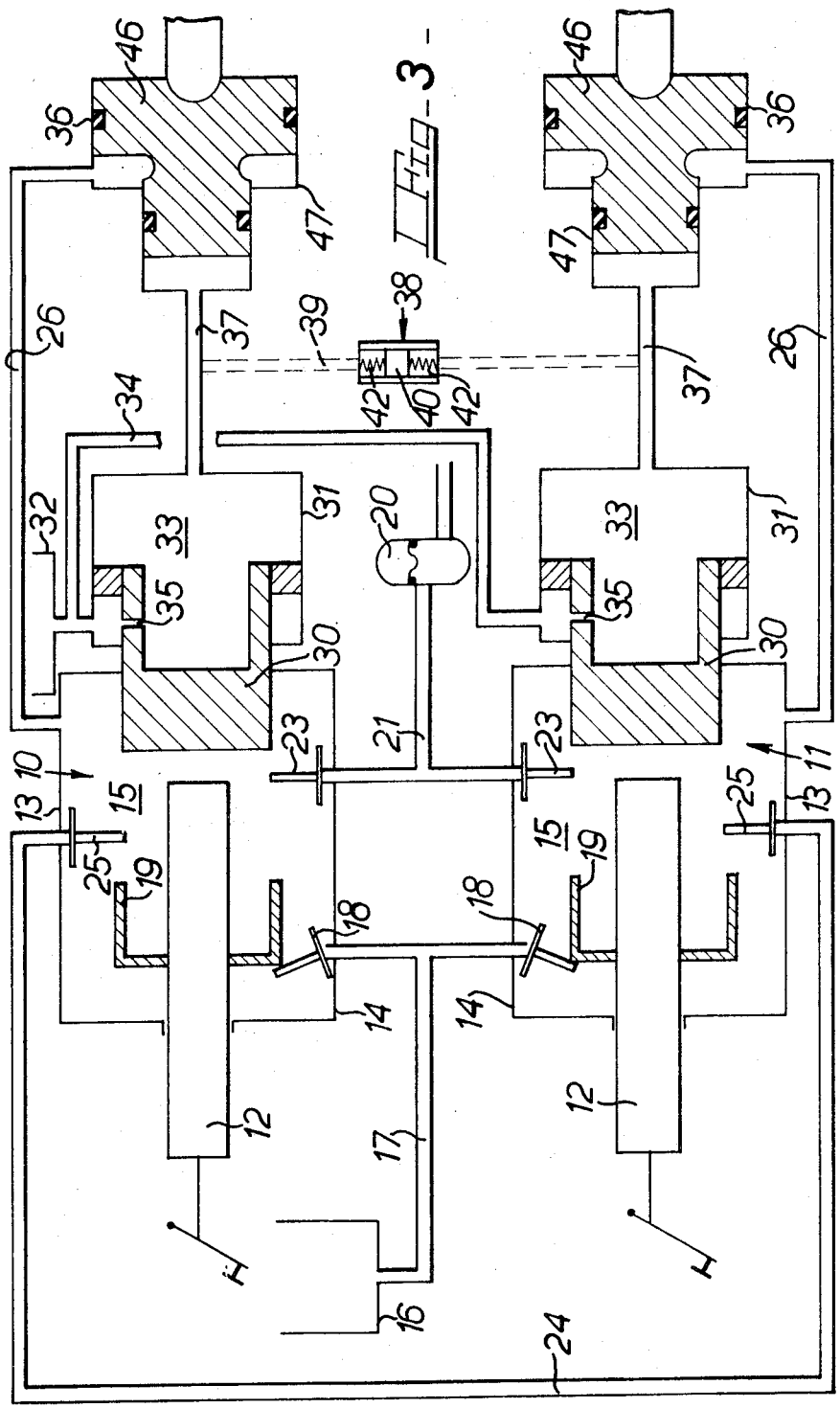
FIG. 3 is a schematic layout of a further modified braking system.

The embodiment of FIG. 3 is similar to that described above in FIGS. 1 and 2 and corresponding reference numerals have been used to indicate corresponding parts.

In this construction the pressure space 15 in each master cylinder is connected through the connection 26 to the slave cylinders of the brakes on the wheels on that side of the vehicle controlled by that master cylinder, and the secondary pressure space 33 of that cylinder is connected to the slave cylinders through the connection 37. Each slave cylinder 36 comprises a differential piston 46 working in a stepped bore 47 in a cylinder body. In normal operation the pressure from the secondary pressure space 33 acts on the end of the piston 46 of smaller diameter and the pressure from the pressure space 15 acts on a step in the piston 46 at the change in diameter. In a modification the connections between the pressure spaces and the slave cylinders may be interchanged.

The operation of the embodiment of FIG. 3 is, in the main, identical with that described above with reference to FIG. 2. However, in the event of failure of either of the secondary pressure spaces, the brakes on opposite sides of the vehicle can still be applied independently or simultaneously by the supply of fluid under pressure to the slave cylinders 36 from one or both pressure spaces 15.

The areas of the differential pistons 46 over which the supplying pressure acts are chosen such that the forces applied to the piston 46 from the pressure spaces are equal. Alternatively, the areas may be chosen such that the forces applied to the piston 46 from the pressure spaces are different.

A practical construction for each master cylinder incorporated in the embodiment of FIG. 3 is illustrated in FIG. 4 of the drawings and corresponding reference numerals have been used to indicate corresponding parts. Features of the master cylinder illustrated in FIG. 4 form the subject of our pending Pat. application Nos. 28296/68, 28297/68, 28298/68, 28299/68 and 16377/69, and these features need not be described further herein.

The master cylinder illustrated in FIG. 4 can be adapted for use in the embodiment of FIG. 2 simply by omitting the outlet connection 26 from the pressure space 15. Similarly it can be adapted for use in the embodiment of FIG. 1 by omitting the secondary piston 30, the connection 34 from the hydrostatic reservoir and the connection 37 to the brakes.

I claim:

1. A two-pedal hydraulic braking system, comprising in combination:

a pair of master cylinders, each said cylinder including a cylinder body having a bore and a pedal-operated piston working in said bore;

a first passage in each said cylinder body connected to a source of fluid under pressure and opening into a primary pressure space defined in said bore in front of said pistons, connections being provided between said pressure spaces and brakes on wheels on opposite sides of a vehicle;

a normally closed first valve at each cylinder body controlling said first passage;

a second passage in each said cylinder body leading into said primary pressure space;

a reservoir for the fluid system connected to said second passage;

a normally open second valve at each cylinder body controlling said second passage;

a third passage leading into said primary pressure space in each said master cylinder, the third passage of one master cylinder being connected to the third passage of the other master cylinder; and a normally closed transfer valve at each cylinder controlling said third passage;

said first valve, said second valve and said transfer valve each comprising a spring-loaded tipping valve adapted to be actuated by said pedal-operated piston whereby simultaneous operation of both of said pistons opens both of said transfer valves to connect both of said primary pressure spaces.

2. The invention as claimed in claim 1, wherein each transfer valve is adapted to be opened after closure of said second valve has been effected, and before opening of said first valve.

3. The invention as claimed in claim 1 incorporating a separate connection between said primary pressure space of each master cylinder and slave cylinders of wheel brakes on the side of the vehicle which said primary pressure space is adapted to supply.

4. A two-pedal hydraulic braking system comprising in combination:

two master cylinders, each said master cylinder including a cylinder body having a bore substantially closed at its inner end, a pedal-operated piston working in said bore in said cylinder body, and having an inner end, a secondary piston working in said cylinder bore in a position in advance of and spaced from said inner end of said pedal-operated piston and having an inner end, a primary pressure space being defined in said cylinder bore between said pistons;

a first passage in each said cylinder body connected to a source of fluid under pressure and opening into said primary pressure space;

a normally closed first valve at each cylinder body controlling said first passage;

a second passage in each said cylinder body leading into said primary pressure space;

a reservoir for hydraulic fluid connected to said second passage;

a normally open second valve at each cylinder body controlling said second passage;

a secondary passage space defined in said cylinder bore between said inner end of said secondary piston and said inner end of said bore;

a normally open third valve providing communication between said secondary pressure space and a second reservoir for hydraulic fluid and adapted to be closed when said secondary piston is advanced in said cylinder bore whereby fluid in said secondary pressure space is pressurized, connections being provided between both pressure spaces of both master cylinders and brakes on wheels on opposite sides of said vehicle;

a third passage at each said master cylinder leading into said primary pressure space, the third passage of one master cylinder being connected to the third passage of the other master cylinder;

a normally closed transfer valve at each cylinder controlling said third passage; and means mechanically actuated by said pedal-operated piston for opening said transfer valve on axial movement of said piston, whereby simultaneous operation of both of said pistons opens both of said transfer valves to connect both of said primary pressure spaces.

5. The invention as claimed in claim 4 wherein said first valve, said second valve and said transfer valve of each master cylinder each comprises a spring-loaded tipping valve and wherein a stem incorporated in said tipping valve extends into said bore in said cylinder body, each valve being adapted to be tipped in an open position by an engagement with its stem of a part of said pedal-operated piston.

6. The invention as claimed in claim 5, incorporating means for equalizing the pressures in said secondary pressure spaces of said master cylinders to compensate for wear of the friction linings when both master cylinders are operated simultaneously.

7. The invention as claimed in claim 6, wherein said means for equalizing said pressures comprises a line connecting said secondary pressure spaces and a shuttle valve located in said line, said shuttle valve comprising a housing having an open-ended bore a valve member movable in said open-ended bore to equalize the pressures, and a pair of oppositely acting return springs normally holding said valve member in a centralized position.

8. The invention as claimed in claim 7, wherein a separate connection is provided between each primary pressure space and each secondary pressure space in each master cylinder and common slave cylinders of brakes on wheels on that side of the vehicle which that master cylinder is adapted to supply.

9. The invention as claimed in claim 8, wherein each slave cylinder comprises a housing having a stepped cylinder bore, a differential piston working in said stepped cylinder bore, and wherein the pressure from each pressure space of one master cylinder acts on a different area of the differential piston.

10. The invention as claimed in claim 9, wherein the pressure in said secondary pressure space acts on the end of said differential piston of lesser diameter, and the pressure in said primary pressure space acts on the face of said differential piston at a step in the change in diameter.

11. The invention as claimed in claim 9, wherein the pressure in said secondary pressure space acts on a face of said differential piston at a step in a change in diameter, and the pressure in the primary pressure space acts on the end of said piston of lesser diameter.

* * * * *